United States Patent
Langille et al.

(12)

(10) Patent No.: US 6,222,157 B1
(45) Date of Patent: Apr. 24, 2001

(54) SEAMLESS HOLOGRAPHIC TRANSFER USING LASER GENERATED OPTICAL EFFECT PATTERNS

(75) Inventors: William A. Langille, Amherst; Lee A. Batchelder, Derry; Eitan Chaim Zeira, Nashua, all of NH (US); Christopher Alan Barnett, Lechlade (GB); Joseph S. Formosa, Hopedale, MA (US)

(73) Assignee: L.A. Batchelder and Sons Consulting, Inc., Derry, NH (US)

( * ) Notice: Subject to any disclaimer, the term of this patent is extended or adjusted under 35 U.S.C. 154(b) by 0 days.

(21) Appl. No.: 09/061,662

(22) Filed: Apr. 17, 1998

(51) Int. Cl.[7] ................................................. B23K 26/00
(52) U.S. Cl. ................................. 219/121.69; 219/121.82
(58) Field of Search .................... 219/121.68, 121.69, 219/121.73, 121.75, 121.82; 264/400; 216/65; 358/297

(56) References Cited

U.S. PATENT DOCUMENTS

| | | | |
|---|---|---|---|
| 3,985,953 | * 10/1976 | Dunkley | 358/297 |
| 4,377,736 | * 3/1983 | Daunt et al. | 219/121.68 |
| 4,566,938 | * 1/1986 | Jenkins et al. | 219/121.69 X |
| 4,923,572 | 5/1990 | Watkins et al. . | |
| 4,924,257 | 5/1990 | Jain . | |
| 5,160,823 | * 11/1992 | Bennin et al. | 219/121.68 |
| 5,269,983 | * 12/1993 | Schulz | 264/400 |
| 5,291,240 | 3/1994 | Jain . | |
| 5,327,825 | 7/1994 | Parker et al. . | |
| 5,521,030 | 5/1996 | McGrew . | |
| 5,575,931 | * 11/1996 | Stefani | 219/121.68 |
| 5,652,645 | 7/1997 | Jain . | |
| 5,662,986 | 9/1997 | Stepanek . | |
| 5,759,473 | * 6/1998 | Minke et al. | 264/400 |
| 5,886,317 | * 3/1999 | Hinrichs et al. | 219/121.69 |

FOREIGN PATENT DOCUMENTS

| | | |
|---|---|---|
| 0072609 | * 2/1983 | (EP) . |
| 0309148 | * 3/1989 | (EP) . |
| 61-38792 | * 2/1986 | (JP) . |

* cited by examiner

*Primary Examiner*—Samuel M. Heinrich
(74) *Attorney, Agent, or Firm*—Hayes, Soloway, Hennessey, Grossman & hage, PC

(57) ABSTRACT

Apparatus for continuously micro-embossing a seamless precision optical pattern onto a moving substrate without the use of an intermediate layer, comprising an energy source, such as a laser, along with reduction optics, a mask and a moving substrate. The moving substrate provides both precision linear and rotational movement which motion is coupled with the laser projection imaging episode. Etched patterns can therefor be continuously and precisely ablated in the substrate to substantially cover the entire surface to uniquely micro-emboss therein a seamless precision optical image.

7 Claims, 2 Drawing Sheets

SEAMLESS HOLOGRAPHIC TRANSFER USING LASER GENERATED OPTICAL EFFECT PATTERNS

FIELD OF THE INVENTION

This invention is directed to a new apparatus and associated methods, including products produced therefrom, in the field of continuous microscopic embossing. More specifically, the present invention is directed to the use of an energy source, such as lasers, for generating an optical diffraction effect pattern onto a selected substrate, such as a relatively large diameter and large width metal roll, which roll provides for the continuous and reliable production of decorative paper or film.

DESCRIPTION OF THE PRIOR ART

As the present invention relates to the creation of optical effect patterns via preferred laser techniques, and more specifically, to an entirely new method and associated apparatus for micro-embossing applying preferred excimer laser technology, the pertinent art to be reviewed is necessarily focused on three major areas: 1. the general state of micro-embossing methodology; 2. the current use of lasers with focused scanning beams for direct writing on given substrates; and 3. excimer lasers, and excimer laser applications.

1. Micro-Embossing Technology

An excellent review of holographic image transfer technology onto decorative mediums, such as, for example, polyethylene terephthalate (PET) film, can be found in U.S. Pat. No. 5,327,825. As noted therein, holographic images, patterns or designs, are typically transferred or micro-embossed onto a web or length of material (for instance a decorative foil on a carrier web) by a roller which carries on its outer cylindrical surface a shim having a holographic image, pattern or design. Heat and pressure are used to micro-emboss the hologram on the shim from the roller to the web or length of decorative material. This micro-embossing technique is conventional.

That is, the shim which is wrapped around the roller is established in planar form by a micro-embossing operation by which a first small nickel shim which carries the hologram is attached to a stamp, and the hologram is micro-embossed into a planar plastic sheet by a step and repeat process. To facilitate this step and repeat operation, the planar stamping surface is indexed linearly in the X and Y directions across the planar plastic sheet until the micro embossing is completed on the entire planar surface. The sheet is then sprayed with a silver conductive spray and subsequently placed in an electro-plating bath to form a durable nickel shim. This nickel shim is removed from the plastic sheet and can be wrapped around a cylinder to form a cylindrical embossing die.

It is plainly evident that the above conventional micro-embossing technique is a long and involved process, and once the nickel shim is wrapped around the cylinder, the ends of the nickel shim will form a side-to-side break in the holographic pattern so that the resulting holographic foil includes a production seam made after each revolution of the cylinder. It is also noted that there will be "recombining" seams created by "recombining" the design by the step and repeat process.

Various solutions have therefore been proposed in the prior art to deal with the various seams or gaps, which detract, as noted, from the appearance of the replications, some of the more prominent ones summarized below.

For example, U.S. Pat. No. 4,923,572 is directed to a cylindrical embossing tool which can be used for embossing a web of material without leaving seams. Described in this patent is a complex method wherein the cylindrical embossing tool is made by first placing in conforming relationship a seamless coating or layer of an embossable material around the exterior surface of a rigid cylinder. A desired image or pattern is stamped over substantially the entire exposed surface of the embossable material supported by the rigid cylinder. An electroform of the stamped image is then made by electrodeposition of metal such as nickel thereon and a reinforcement layer is applied over the imaged electroform. Then the rigid cylinder is removed to leave, in the form of a cylinder, an image carrier of the embossed layer, the electroformed image and the reinforcement layer. The embossed layer is stripped from the cylindrical electroformed image carrier resulting in a plating mandrel of the electroformed image and reinforcement layer. A second electroform is then made by electrodeposition of a metal on the first imaged electroform which is on the interior of the plating mandrel. The second imaged electroform is removed from the plating composite and can be used to emboss webs of material in continuous manner.

In U.S. Pat. No. 5,327,825, noted above, there is disclosed a method for producing a die which carries a pattern, image or design to be embossed on a decorative medium, such that the image, pattern or design on the decorative medium includes no production seams. More specifically, a layer of silver embossable material is plated onto a cylinder surface. The silver is then heated in preparation for receiving the pattern from a concave shaped stamping surface which has a radius matching the radius of the cylindrical surface of the cylinder. The stamp carrying the pattern to be imparted into the pure silver layer is also heated in preparation for the micro-embossing operation. Upon micro-embossing the pattern into the pure silver layer on the cylindrical surface of the die, the die or stamp carrying the pattern must be indexed at least rotationally and linearly. The cylinder is then cooled and polished. A layer of chrome can optionally be provided to reinforce the micro-embossed surface.

U.S. Pat. No. 5,662,986 discloses holographic images for security and decorative purposes. In particular, holographic images are described as being transferred to a paper tissue substrate by first laminating the holographic images on a polymeric substrate, and then transferring. The lamination of the holographic image on the polymeric substrate is described as conventional, and the polymers employed include polyethylene, polypropylene, and polyethylene terephthalate.

2. Focused-Beam Direct Writing Systems

Focused beam direct writing systems typically employ ultraviolet or blue laser in a raster scanning fashion to expose all the pixels, one at a time, on the substrate. The laser beam is focused, on the resist-coated board to the desired spot size. The focused spot is then moved across the board in one dimension with a motor driven scanning mirror. In conjunction, the stage holding the board is translated in the orthogonal dimension with a high speed stepping motor. Simultaneously, the laser beam is modulated to be either directed to the desired location on the board or deflected away. Thus, by driving the modulator and the two motors with appropriately processed pattern data, the entire board can be directly patterned. Of the many focused-beam direct write systems currently available, the offered resolution varies from 0.5–1.0 mil for printed circuit board patterning to tinder a micron for systems designed for mask making applications for IC lithography.

In U.S. Pat. No. 4,924,257 there is disclosed a method for providing a scan and repeat lithography system for high resolution, large-field, high-speed lithography. More specifically, a lithography method is disclosed which contains a scan and repeat system characterized by complimentary edge illumination by adjacent scans for producing precise images of a high resolution pattern from a mask onto a substrate at high speed and over an image field said to be substantially larger than the maximum field size of the imaging optics. The specific illumination comprises X-ray illumination.

In U.S. Pat. No. 5,291,240 there is disclosed a projection imaging system which can pattern very large microelectronic boards, display panels or semiconductor wafers at high production speeds and with high resolution. Light from a laser or lamp source is modified to provide an equal intensity illumination beam of specific shape across which the substrate is moved in a scan-and-repeat fashion to achieve uniform, seamless exposure over the entire substrate surface. Adjacent scans are made to partially overlap, in such a way that in the overlap region the exposures from the two scans are complimentary whose sum equals the exposure in the non-overlapping regions, leading to what is described as a uniform, seamless exposure of the whole substrate.

In U.S. Pat. No. 5,521,030 there is disclosed a method for producing what are said to be durable embossing tools. An anisotropic etching process, such as ion etching, is used to etch a relief pattern into a hard substrate. A transfer layer is formed overlaying a generally smooth, seamless surface region of the substrate. A desired relief pattern is formed in the transfer layer, by exposing a photoresist, embossing, or the like. The substrate having the photoresist thereon is then subjected to an anisotropic etch. The aniostropic etch continues until the transfer layer is completely removed and the relief pattern is formed in the upper surface of the embossing tool.

In U.S. Pat. No. 5,652,645 a projection imaging system is described for patterning large, flexible substrates at high exposure speeds and desired resolution, the substrates being in the form of a continuous band fed from a roller for cost-effective electronic module manufacturing.

3. Excimer Laser Machining

Ultraviolet light from an excimer laser is known to interact directly with the chemical bonds in a target material. These bonds are instantaneously broken, turning the material into a plume of free atoms, molecules and ions which are then ejected from the irradiated site. Since this process is a photochemical process and not a thermal one, the surrounding material does not suffer from thermal effects. The chances of thermal damage to surrounding materials are also reduced by the short pulse duration available with a excimer laser. Pulse duration is typically less than 25 ns, but more importantly, the duration between pulses is on the order of a millisecond. Consequently, any minor local heat produced by the pulse has ample time to dissipate before the next pulse arrives.

Excimer laser micro-machining has therefore established itself as a useful process for hole drilling, selective material removal, marking, thin-film patterning and micro-milling. At full power, 200 W, excimer lasers are known to have an etch rate of about 1 $\mu$m per pulse. The excimer laser can also selectively cut through laminated layers, one at a time. This selective material removal aspect has been employed in the flex circuit and multi-chip module industry.

Accordingly, it is a first general object of this invention to develop an entirely new route for the continuous production of a seamless embossed diffraction pattern surface image, such as a decorative pattern visible to the human eye, as applied to various given substrates, such as paper or coated paper, and plastic film.

More specifically, it is an object of this invention to uniquely apply the various advantages of laser technology, and in particular excimer laser technology, for the direct etching and production of a seamless production substrate, which substrate can then be used for the continues manufacture of diffraction pattern surface images.

Finally, it is also an object of this invention to develop micro-embossed substrates such as thin plastic films or coated papers embossed with seamless patterns, made by the unique continuous process and associated novel apparatus as disclosed herein.

SUMMARY OF THE INVENTION

Apparatus for continuously micro-embossing a seamless precision optical pattern onto a moving substrate without the use of an intermediate layer comprising an energy source such as a laser, and reduction optics and a mask including a moving substrate. The moving substrate provides both precision linear and rotational movement for said laser to selectively ablate said moving substrate by projecting said laser through said mask onto said moving substrate. The movement of said moving substrate is coordinated with the laser projection so that etched patterns are continuously ablated to substantially cover the entire surface of the moving substrate to emboss on the moving substrate a seamless precision optical image.

In method form, the present invention relates to a method for continuous micro-embossing of a seamless optical effect pattern into a given substrate, whereby to etch said seamless optical effect pattern onto a moving substrate comprises projecting an energy source ti-rough reduction optics and through a mask onto said substrate and selectively and continuously ablating, said substrate surface.

Finally, in product form, the present invention relates to substrates with seamless decorative diffraction patterns produced by the apparatus and process of the present invention, as noted above, and in further detailed description, as described herein.

DETAILED DESCRIPTION OF THE INVENTION

Figure 1:
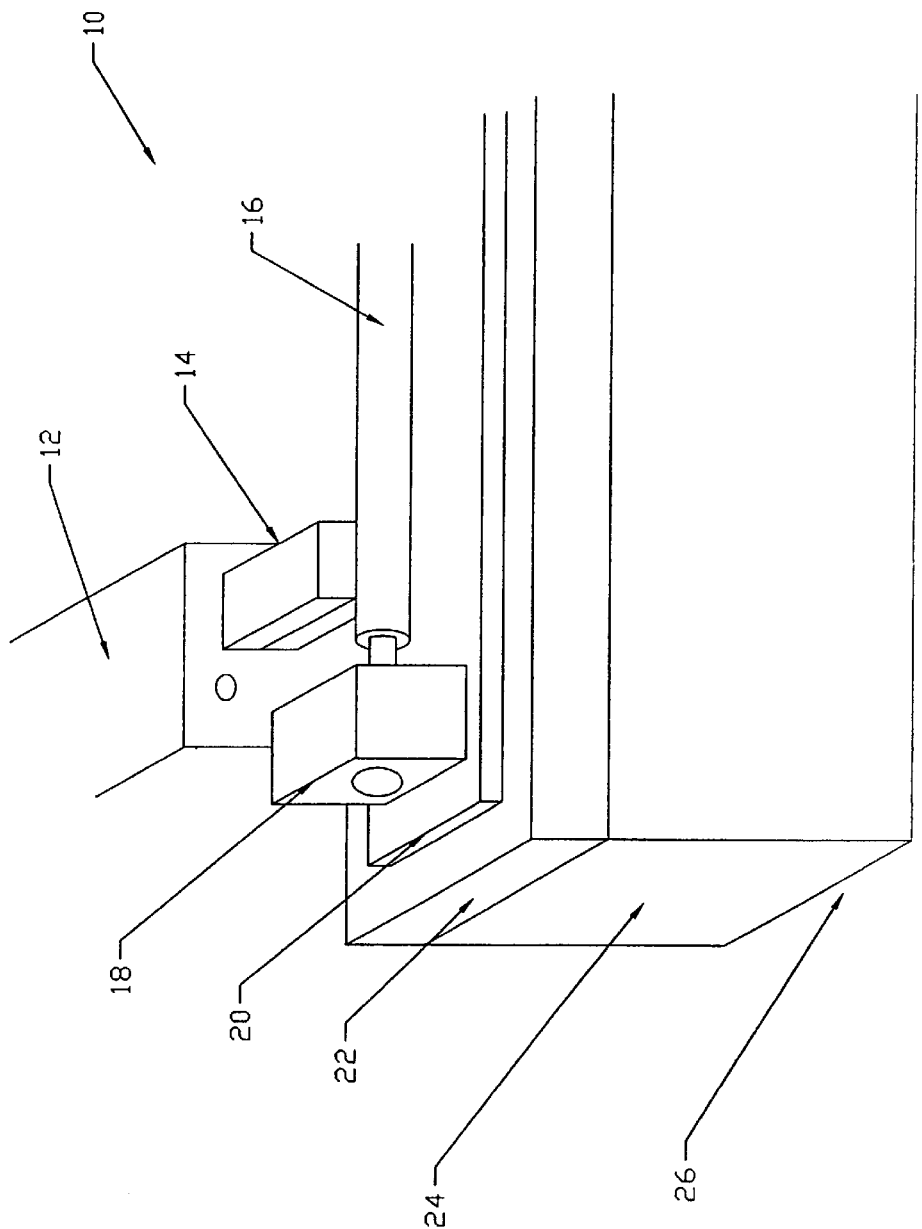
FIG. 1 illustrates the apparatus of the present invention for continuous micro-embossing of a seamless precision diffraction pattern onto a roll substrate.

As is clear from the above, in preferred embodiment, the present invention contemplates the use of two important components: 1. the use of an energy source, such as electron-beam, ion-beam, and/or laser source, such as an excimer or yttrium-aluminum-garnet (YAG) laser, to directly and continuously etch optical effect patterns, such as holographic patterns to generate a desired visual effect, onto a selected substrate, such as a roller, without the use of an intermediate layer (i.e. photoresist, silver halide, etc); and 2. the correlation of said roller's linear and rotational movement to the laser's imaging episode so as to produce a seamless pattern.

The present invention also contemplates, in an alternative embodiment, the placement of laser reduction optics and the mask on a movable roller carriage capable of linear movement, wherein said carriage linear movement is coordinated with the movement of said moving substrate so that again, etched patterns are continuously ablated to provide a seamless precision optical image such as a desired optical pattern.

More specifically, in preferred embodiment, the desired pattern is first photolithographically produced on a chrome mask that is used through reduction optics to image the excimer pulses onto a roll in a variation of the "step-and-repeat" methodology. That is, in the present invention, contrary to the "step-and-repeat" methods of the prior art, the substrate, or preferred metallic roll, is continuously rotating as the excimer laser pulses an image to the roller's surface. The roll rpm and linear movement and the laser pulse frequency are then preferably matched through a feedback loop such that the imaged patterns are laid down in a seamless fashion. In other words, the laser images the patterns in spiral continuous fashion down the length of the roll akin to a lathe action that produces a screw pattern on a rod.

As noted, in preferred embodiment, the apparatus of the present invention is employed to generate a desired optical effect pattern into a metal roll, which metal roll can then be used for continuous production of a diffraction or holographic image on plastic film, derived from polyethylene, polypropylene, and/or polyethylene terephthalate resin, and/or other similar substrate materials, such as coated paper, suitable for holographic image transfer.

Alternatively the apparatus of the present invention is employing to generate a desired optical effect pattern into a plastic roll.

The metal roll which contains the excimer etched continuous diffraction pattern is preferably made of stainless steel, copper, or chrome, and is polished and coated with a ceramic material, preferably selected from the group consisting of oxides, nitrides and/or carbides of Ti, Cr, W, Ta, Si, B, or mixtures thereof, and/or multilayers thereof. The ceramic coating is conveniently applied by a chemical or physical vapor deposition process. In addition to ceramic coatings, one can employ polymer coatings such an acrylic, polycarbonate or polyimide, including thermoset coatings, such as an epoxy, as well as Paralyne® type polymer coatings, which provide a polynuclear aromatic plasma type structure. The ceramic or Paralyne® coating supplies the additional advantage in that such coating offers an improved response to excimer laser etching, and as such, in accordance with the present invention, such coatings can be optimized to provide more efficient etching of a given optical image.

In connection with the lasers used herein, both excimer lasers and yttrium-aluminum-garnet (YAG) lasers are preferred, and currently in the most preferred embodiment, an excimer laser is employed. In connection with such highly preferred excimer laser projection capabilities, one can achieve continuous ablation of holes in the moving substrate on the order of 0.1 $\mu$ to 20 $\mu$ in diameter with depths ranging from about 0.05 $\mu$ to 3 $\mu$. More preferably, hole diameters of about 1.0 $\mu$ are achieved with a 1.0 $\mu$ depth, and in an even more preferred embodiment, the hole diameter is 1.0 $\mu$ with a 0.1 $\mu$ depth.

In addition, for a given excimer laser projection episode, and depending upon the mask selected, a plurality of holes can be ablated in a given projection, e.g., at least 1000 holes, preferably between 1000 and 200,000, and more preferably 5000–30000 holes for the step and repeat methodology employed herein.

Attention is next directed to FIG. 1, which illustrates the preferred apparatus 10 of the present invention for continuous micro-embossing of a seamless precision diffraction pattern onto a roll substrate. More specifically, at 12 is the energy source, at 14 is placed the mask and reduction optics (lenses) and at 16 is the roll upon which the precision seamless diffraction pattern will be embossed. The roll is attached to a rotational lathe 18 which itself rests upon a precise positioning system 20 which rests on a lathe-type bed 22. The lathe itself is mounted on a granite mass 24 and isolation pad 26. The precise positioning system 20 is available from Neuman Technologies, Inc., Bow, N.H.

Figure 2:
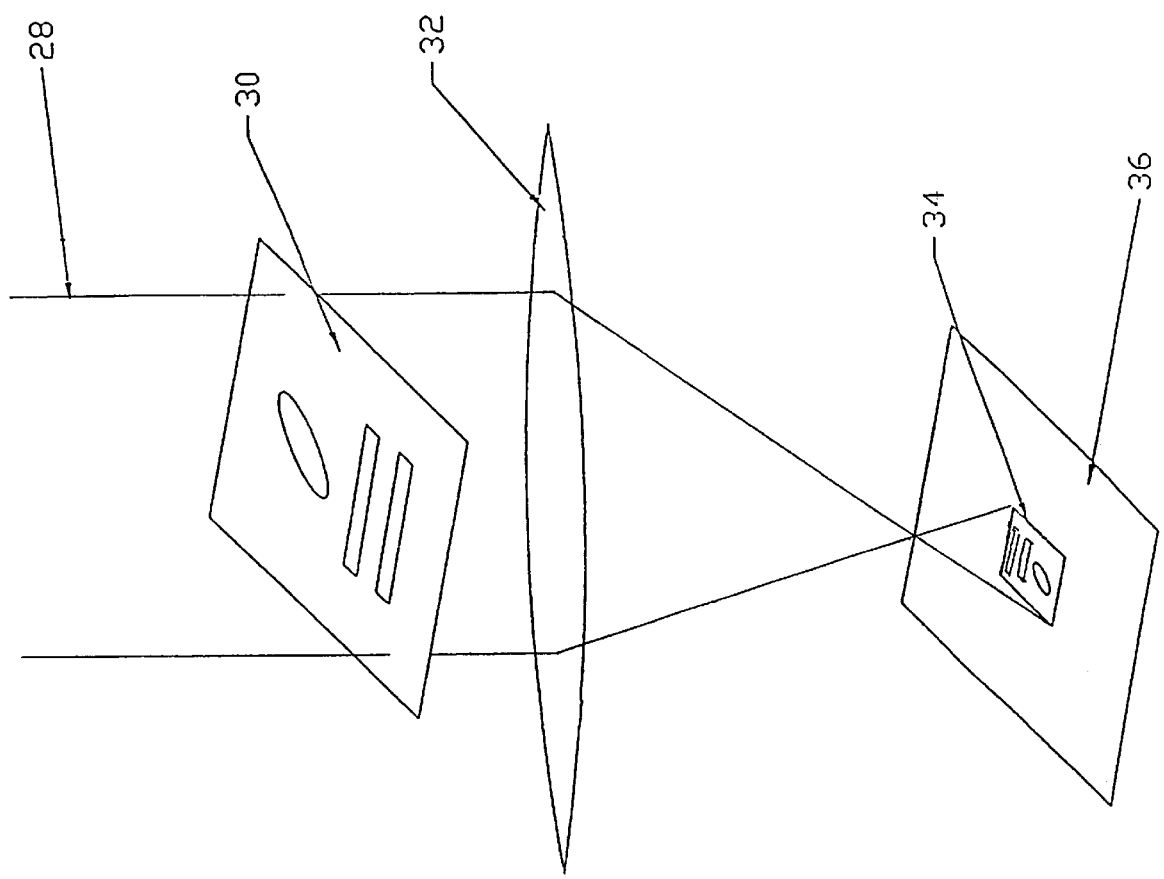
FIG. 2 illustrates the preferred use of an excimer laser for continuous micro-embossing as described herein.

FIG. 2 illustrates in more detail the use of mask and reduction optics (lenses) noted above. More specifically, a preferred excimer laser beam 28 is projected through mask 30 and reduction optics 32 such that the mask image 34 is projected onto substrate surface 36.

Accordingly, those skilled in the art will recognize the utility of the present invention for uniquely manufacturing seamless precision optical patterns onto a given substrate without the use of intermediate layers, as set out in the following claims.

What is claimed is:

1. A method for continuous micro-embossing of a seamless optical effect pattern onto a substrate comprising:

supplying an energy source, reduction optics and a mask for said energy source;

supplying a rotatably and linearly moving cylindrical substrate comprised of stainless steel, copper, chrome, or plastic, coated with a ceramic coating;

projecting said energy source through said reduction optics and through said mask onto said linearly and rotatably moving substrate to selectively ablate said substrate surface in a continuous spiral fashion with said energy source to etch onto said substrate a seamless optical effect pattern.

2. The method of claim 1, wherein said energy source is an electron-beam, ion-beam or laser.

3. The method of claim 2, wherein said laser is an excimer laser or an yttrium aluminum garnet.

4. The method of claim 1, wherein said substrate is a metal roll, and said seamless optical effect pattern is ablated on said roll surface in a continuous spiral fashion, and said pattern comprises a plurality of holes at about 0.1 $\mu$ to 20 $\mu$ diameter and depths from about 0.05 $\mu$ to 3 $\mu$.

5. The method of claim 1, including the step of embossing said seamless optical effect pattern onto plastic film or paper by pressing said film or paper with a metal roll.

6. A method for continuous micro-embossing of a seamless optical effect pattern onto a substrate comprising:

affixing an energy source, reduction optics and a mask for said energy source to a linearly movable carriage;

supplying a rotatably moving substrate comprised of stainless steel, copper, chrome, or plastic, coated with a ceramic coating;

projecting said energy source through said reduction optics and through said mask onto said rotatably moving substrate; and linearly moving said carriage relative to said rotatably moving substrate to selectively and ablate said substrate surface in a continuous spiral fashion with said energy source to etch onto said substrate a seamless optical effect pattern.

7. The method of claim 8, wherein said energy source is an electron-beam, ion-beam or laser.

* * * * *